United States Patent [19]

Kranz

[11] 4,352,256
[45] Oct. 5, 1982

[54] GREENHOUSE STRUCTURE

[76] Inventor: Dale P. Kranz, 1305 Third Ave., S., Great Falls, Mont. 59405

[21] Appl. No.: 238,709

[22] Filed: Feb. 27, 1981

[51] Int. Cl.³ .............................................. A01G 9/14
[52] U.S. Cl. ........................................ 47/17; 52/65; 104/35
[58] Field of Search ............... 47/17, 65, 1.1; 104/35; 119/16; 52/65

[56] References Cited

U.S. PATENT DOCUMENTS

| | | | |
|---|---|---|---|
| 1,753,980 | 4/1930 | Baumgartner | 47/17 |
| 1,981,418 | 11/1934 | Kreutzer | 119/16 |
| 3,254,447 | 6/1966 | Ruthner | 47/65 |
| 3,579,907 | 5/1971 | Graves | 47/17 |
| 3,675,378 | 7/1972 | Neumann | 52/65 |
| 3,717,953 | 2/1973 | Kuhn et al. | 47/17 X |
| 3,771,258 | 11/1973 | Charney | 47/17 X |
| 3,824,736 | 7/1974 | Davis | 47/17 |
| 4,216,615 | 8/1980 | Soderberg | 47/17 |
| 4,244,146 | 1/1981 | Kranz | 47/17 |
| 4,291,797 | 9/1981 | Ewertowski | 104/35 X |

FOREIGN PATENT DOCUMENTS

| | | | |
|---|---|---|---|
| 250093 | 2/1966 | Austria | 47/65 |
| 1047892 | 11/1966 | United Kingdom | 47/17 |

Primary Examiner—Robert E. Bagwill
Attorney, Agent, or Firm—Shoemaker and Mattare, Ltd.

[57] ABSTRACT

A greenhouse structure includes a central hub having a revolving floor therein and a plurality of arms radiating outwardly from that hub. The arms are growth chambers, and movable trays located within those growth chambers move plants from the arms onto and from a workbench in the hub.

10 Claims, 8 Drawing Figures

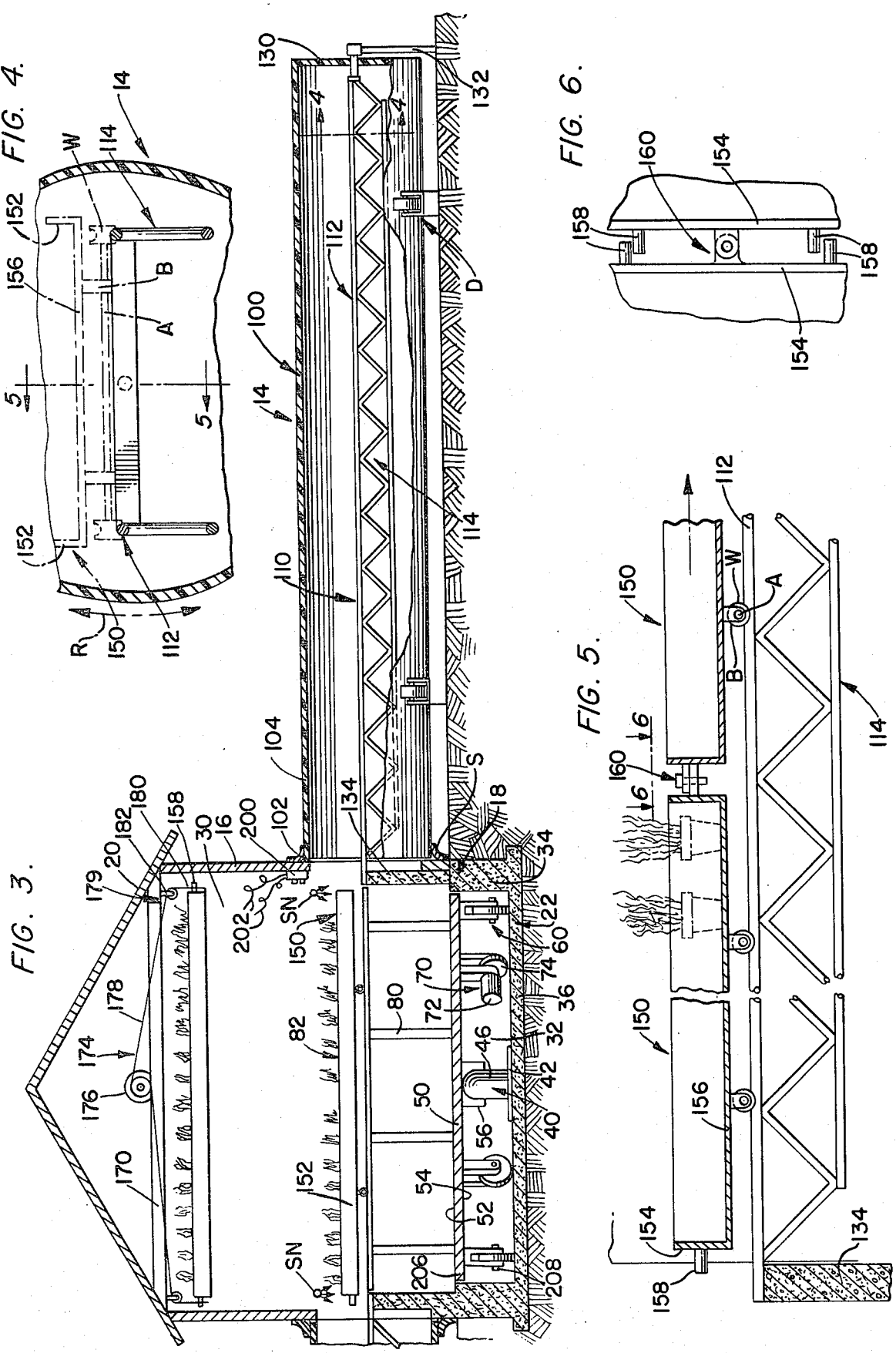

GREENHOUSE STRUCTURE

BACKGROUND OF THE INVENTION

The present invention relates in general to building structures, and, more particularly, to structures used in horticulture.

Known greenhouses are extremely wasteful of energy due to the inclusion therein of aisle space. For example, as much as 30% of the space in known greenhouses is aisle space. This aisle space is required for servicing the plants, but is still wasteful of energy.

Furthermore, due to the spread-out nature of known greenhouses, supervision of workers is very difficult, if not impossible, and equipment and supplies are spread out.

A further drawback of known greenhouses is the environmental conditions therein must be maintained according to the needs of the plants, and not according to the needs of the workers. This drawback is further exacerbated when various plants may require different ambient conditions. Only one ambient condition at a time can be established in known greenhouses. Thus, workers, and some plants, are exposed to non-ideal conditions.

Further to the just-mentioned drawback is the danger presented to workers and some plants if insecticides or fungicides are being used on some of the plants in the greenhouse. If only a limited number of plants are to be treated with insecticides or fungicides, it is unwise, and potentially dangerous, to expose all plants and workers to such chemicals.

Still another drawback to known greenhouses is the limited number of plants which can be serviced at any one time. A worker must move down an aisle while servicing only those plants within his reach. Such a method is inefficient.

Thus, there is a need for a structure which reduces to a minimum, if not essentially eliminates, aisle space and locates all of the workers in a central area which can be efficiently supervised. Convenient access to necessary tools, equipment and supplies is also required. There is also a need for a greenhouse which provides proper, and perhaps different, ambient conditions for workers and various plants, and protects those workers and various plants from environmental conditions which may be undesirable, or even harmful, for them.

SUMMARY OF THE INVENTION

The work structure embodying the teachings of the present invention includes a hub which has a circular wall and a revolving floor. A workbench is mounted on the revolving floor and supports trays containing the items to be worked on.

A plurality of stationary arms radiate outwardly from the hub and include growth chambers therein. The arms can be any shape, but a tubular shape is preferred. Each growth chamber contains a rail which can be aligned with the workbench in the hub to transfer trays to and from that workbench.

In the preferred embodiment, the growth chambers are greenhouses, and plants are located on the trays. Essentially no aisle space is defined in the growth chambers.

To work on, load or package plants on a tray, the tray is moved into the "hub" (workroom). When necessary action is completed on the plants in a tray, that tray is reinserted into the growth chamber associated therewith. The floor and workbench of the workroom are then revolved to be aligned with the next growth chamber, and so on.

The following advantages result from the structure embodying the present invention:

1. Workers are all located in a manageable area where their materials are readily accessible and a supervisor has visual control over the workers.
2. Unprofitable aisle space (which is costly to heat and cool, and 30% of known greenhouses constitutes aisle space) is eliminated.
3. Employees can work in a controlled atmosphere comfortable to humans (air conditioned, heated, well lighted), day or night.
4. Plants grow toward the sun. Using this structure, it is possible to turn a complete bench of plants around with a simple motion, i.e., pull the tray into the workroom, turn the tray around on the revolving floor and reinsert it into the growth chamber.
5. Plants can be sprayed as they re-enter the growth chamber. This is a safety feature for the grower who presently must drag a spray hose into the sprayed environment, and also conserves labor (the plants pass by the spray nozzles, no hoses).
6. Separate structures can be interconnected for enlarging facilities. For example, one structure may contain propagation, another structure may contain early growing plants, while yet a third structure may be for finish and packing steps. Each unit can have the proper equipment to take care of the function associated therewith.

The structure of the present invention thus:

1. Conserves energy (heating and cooling) by eliminating aisle space (non-productive area).
2. Improves efficiency by eliminating countless trips up aisles to service plants, having all help within visual sight of management, having materials readily accessible to workers, and moving hundreds of plants at one time instead of a dozen or so at a time, and the like.
3. Provides a safe way of fumigating or applying insecticides and fungicides (the plants are exposed to the poisonous materials without the presence of a grower).

Such a work structure is ideally suited to handicapped workers, as the work is brought to the worker rather than requiring the worker to go to the work.

OBJECTS OF THE INVENTION

It is a main object of the present invention to conserve labor and energy in plant developing structures.

It is another object of the present invention to improve efficiency of plant developing processes.

It is a further object of the present invention to improve safety in plant developing structures.

It is yet another object of the present invention to provide varied environmental conditions in plant developing structures.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 3 is an elevation view taken along line 3—3 of FIG. 2.

FIG. 4 is an elevation view taken along line 4—4 of FIG. 3.

FIG. 5 is an elevation view taken along line 5—5 of FIG. 4 showing portable trays moving in one of the growth arms of the structure embodying the teachings of the present invention.

FIG. 6 is a plan view taken along line 6—6 of FIG. 5.

DETAILED DESCRIPTION OF THE INVENTION

Figure 1:
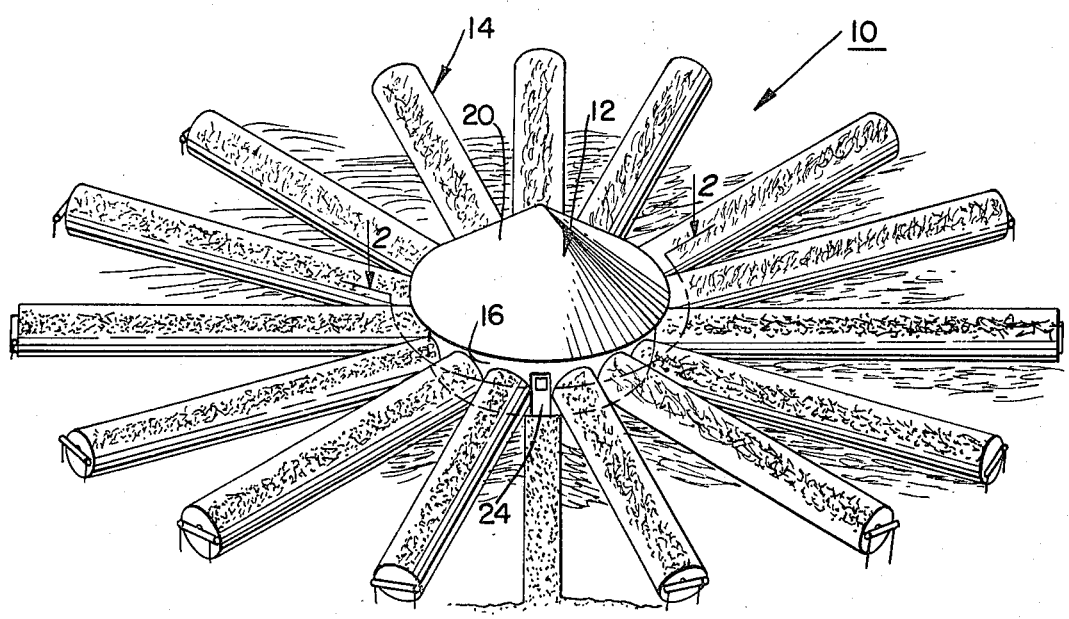
FIG. 1 is a perspective of a structure embodying the teachings of the present invention.

Shown in FIG. 1 is a work structure 10 which preferably is a horticulture work structure. The structure 10 includes a central hub 12 which preferably is circular in circumferential shape, but can be other shapes without departing from the scope of this invention. A multiplicity of arms 14 extend radially outward from the hub and are circumferentially disposed about such hub. The hub includes a wall 16 resting on a foundation 18 and supporting a roof 20. The foundation includes a footing 22 set beneath ground level, as best shown in FIG. 3. A door 24 provides access to the interior of the hub which forms a workroom 30.

Figure 2:
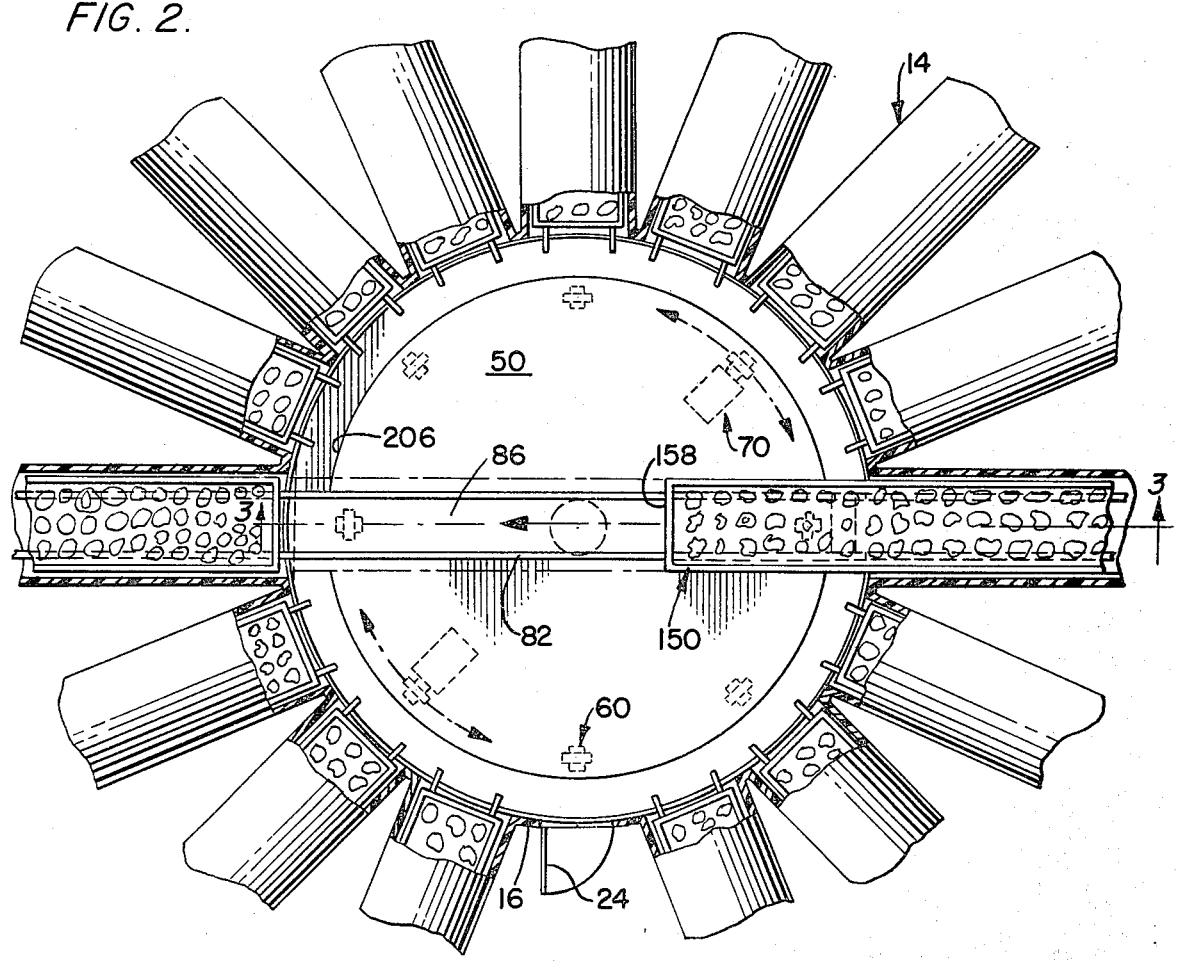
FIG. 2 is a plan view taken along line 2—2 of FIG. 1.

As best shown in FIG. 3, the footing has a recessed space 32 defined therein by wall 34 and bottom 36, and, as best shown in FIG. 2, the foundation is circular in shape to correspond to the shape of the central hub. A king post 40 is mounted centrally of the footing and includes a base 42 and an upstanding stanchion 46 mounted on the base. A planar floor 50 forms a turntable and is revolvably mounted on the king post and includes a planar top surface 52 and an undersurface 54. A bearing 56 is mounted centrally on the floor to receive the stanchion 46 so the floor can revolve about and be supported by the king post. A plurality of support wheels 60 are mounted on the floor undersurface near the outer rim thereof to provide further support for the floor.

Floor drive assemblies 70 are mounted on the floor, and each assembly includes a motor 72 drivably connected to a drive wheel 74. The drive wheels frictionally engage the bottom 36 so that floor 50 is driven rotationally about the king post upon actuation of the motors 72. The drive wheels can be engaged with a circular track embedded in the bottom 36, or the like, as suitable. Furthermore, the wheels can include sprockets, brakes, or the like, as suitable.

A plurality of support legs 80 are mounted on top of the revolving floor, and a pair of rails 82 are supported by these legs to extend diametrically of the revolving floor at a height above the floor which is convenient for workers to form suitable and desired operations on flowers, or other objects being processed in the structure 10.

The arms 14 include stationary growth chambers 100 each having one end 102 thereof located closely adjacent the wall 16 of the hub. Seals S are interposed between ends 102 and the wall 16. The chambers preferably are tubular, but can be any shape. The chamber walls 104 are formed of material compatible with the work being processed in the structure 10. For example, if the structure 10 is used to process flowers, the growth chambers form greenhouses. These growth chamber walls can be formed of any material suitable to promoting the growth and development desired for the items housed in the arms 14. Those skilled in the art will understand the type of material necessary based on this disclosure, and thus no further description thereof will be presented.

As best shown in FIG. 3, each arm 14 has a tray supporting table 110 extending longitudinally therewithin. The table includes a pair of support rails 112 each of which is horizontally oriented on a truss arm 114. The opposite end 130 of the chamber is closed and the truss arms are supported by truss piers 132 and 134.

In the preferred embodiment, two portable trays 150 are supported in selectively couplable end-to-end alignment on the rails in each growth chamber, as best shown in FIG. 5. The portable trays 150 are each rectangular and each includes sides 152 and ends 154 connected by a bottom 156 to form an open topped tray. Lugs 158 are mounted on each end of selected trays in each arm to extend longitudinally outwardly of that selected tray, and a coupling mechanism 160 is mounted on the ends of all the trays so that a plurality of trays can be moved at one time. Wheels W are mounted on an axle A which is mounted on the bottom of the tray by brackets B. The wheels move on the rails when the trays are moved.

As best shown in FIG. 3, the growth chamber rails are co-planar with the rails 82 so that a tray will be transferred to and from the rails 82 after the rails 82 have been properly aligned with the rails in the growth chamber. The proper alignment of the rails 82 with the growth chamber rails is best shown in FIG. 2.

Preferably, each growth chamber houses a plurality of trays; thus, means must be provided for storing one tray while another tray is being worked on. Such means is best shown in FIG. 3. The means includes a stringer 170 mounted on the wall 16 or the roof 20 of the hub and which extends diametrically across the hub. In the FIG. 3 orientation of the floor, the stringer is longitudinally parallel with and located directly above the rails 82. A tray hoist means 174 is mounted on the stringer and includes a hoist motor 176 connected to hoist cables 178 having bridles 179 on each end with stirrups 180 on the free ends of the cables. The cables are trained around sheaves 182 which are mounted on the stringer.

The stirrups 180 are attached to the lugs 158 when a tray is supported on the rails 82, and actuation of the drive motor lifts the attached tray into an overhead position. The tray remains suspended in such overhead position while a second tray is moved onto the rails 82. After work on the second tray is completed, that second tray is returned to the growth chamber by moving that tray by hand, or otherwise, onto the rails 112 and retracting that second tray into the growth chamber. The first tray is then moved down from the overhead position by reversing the operation of the hoist motor and depositing that tray onto the rails 82. The first tray can then be embayed in the growth chamber in the just-discussed manner. An alternative embodiment includes a dead-head tube into which trays are moved for storage instead of being stored in the just-described tray storage means.

A control means controls operation of the various drive motors so that the floor can be appropriately rotated to align the rails 82 with a desired growth chamber, or to orient the rails beneath the stringer, or the rails. As plant trays re-enter the growth chamber, they can be sprayed simply by turning on a spray pump located under the rails, or at some other convenient location.

| GROWTH TUBES AND TRAYS | | | | | | HUB 12 | | | |
|---|---|---|---|---|---|---|---|---|---|
| Width of Trays 150 | | Total Length of Trays in Each Arm | Area | | No. of Tubes | Total Area | Dia. (Tube Length + 4') | Circumference | Total Area | Moving Floor Area (Dia. − 8') |
| 6' | × | 20' | = 120 sq. ft. | × | 12 | = 1440 | 24 | 75.36 | 452.16 | 200.96 |
| 6' | × | 22' | = 132 sq. ft. | × | 13 | = 1716 | 26 | 81.64 | 530.66 | 254.34 |
| 6' | × | 24' | = 144 sq. ft. | × | 14 | = 2016 | 28 | 87.92 | 615.44 | 314 |
| 6' | × | 26' | = 156 sq. ft. | × | 15 | = 2340 | 30 | 94.2 | 706.5 | 379.9 |
| 6' | × | 28' | = 168 sq. ft. | × | 16 | = 2688 | 32 | 100.5 | 803.8 | 452.2 |
| 6' | × | 30' | = 180 sq. ft. | × | 17 | = 3060 | 34 | 106.8 | 907.5 | 530.7 |
| 6' | × | 32' | = 192 sq. ft. | × | 18 | = 3456 | 36 | 113 | 1017.4 | 615.4 |
| 6' | × | 34' | = 204 sq. ft. | × | 19 | = 3876 | 38 | 119.3 | 1133.5 | 706.5 |
| 6' | × | 36' | = 216 sq. ft. | × | 20 | = 4320 | 40 | 125.6 | 1256 | 803.8 |
| 6' | × | 38' | = 228 sq. ft. | × | 21 | = 4788 | 42 | 131.9 | 1384.7 | 907.5 |
| 6' | × | 40' | = 240 sq. ft. | × | 23 | = 5520 | 44 | 138.2 | 1516.8 | 1017.4 |
| 6' | × | 42' | = 252 sq. ft. | × | 24 | = 6048 | 46 | 144.4 | 1661.1 | 1133.5 |
| 6' | × | 44' | = 264 sq. ft. | × | 25 | = 6600 | 48 | 150.7 | 1808.6 | 1256 |
| 6' | × | 46' | = 276 sq. ft. | × | 26 | = 7176 | 50 | 157.0 | 1962.5 | 1384.7 |
| 6' | × | 48' | = 288 sq. ft. | × | 27 | = 7776 | 52 | 163.3 | 2122.6 | 1519.8 |
| 6' | × | 50' | = 300 sq. ft. | × | 28 | = 8400 | 54 | 169.6 | 2289.7 | 1661.1 |

The number of tubes is based on $\left(\frac{\text{circumference of Hub}}{6'}\right)$ like. The control means includes a control panel 200 connected via leads 202 to suitable means for controlling the drive motors. The control means can include stop and/or indexing means for insuring proper alignment of the rails 82 with the rails of a selected growth chamber and/or proper orientation of the floor 50, or proper alignment of the stringer prior to the hoist motor becoming operative.

The rails have upper surfaces which can be considered to be a workbench. The workbench can have retractable stops on each end thereof if so desired to insure proper orientation of the trays thereon, and can also include retractable aprons on each end thereof to facilitate movement of a tray onto or off of that workbench from or to a conveyor. Such an apron can include a rectangular planar plate. The arms can be any suitable length, and can be arranged so that pairs of arms are diametrically opposed with each other so a tray can be transferred directly from one arm to another arm which is located on the other end of the workbench if so desired. In one embodiment, the arms have lengths equal to twice the diameter of the hub and each tray has a length essentially equal to the length of the workbench. Each arm in such an embodiment contains two trays. Another embodiment includes arms which are equal in length to the diameter of the hub. Other sizes can also be selected for the arms and the hub as will occur to those skilled in the art based on this disclosure. The following table represents examples of such dimensions, areas and numbers of tubes, but is not presented as a limitation. The dimensions are based on a hub diameter being at least four feet greater than the length of a tray. Such relative dimensions permits workers to walk around the end of the workbench in the hub, which workbench is sized according to the size of the trays. These dimensions also assume the revolving floor 50 can have a diameter eight feet less than the diameter of the wall 16. As best shown in FIG. 3, peripheral edge 206 of the floor 50 is spaced from inner surface 208 of the foundation wall to define an annular gap 210.

Spray nozzles SN can be mounted on wall 16 or otherwise positioned to be located at the end of the rails. As plant trays re-enter the growth chamber, they can be sprayed simply by turning on a spray pump located under the rails, or at some other convenient location.

It is also noted that the growth chambers can include closure and revolving means such as disclosed in U.S. Pat. No. 4,244,146, issued to the present inventor, for directing light onto the items in the arms. Revolving of a chamber is indicated in FIG. 4 by arrows R, and rollers D in FIG. 3. The disclosure of this patent is incorporated herein by reference thereto, and thus a complete description of such closure means, and orienting means, will not be presented herein.

Figure 7:
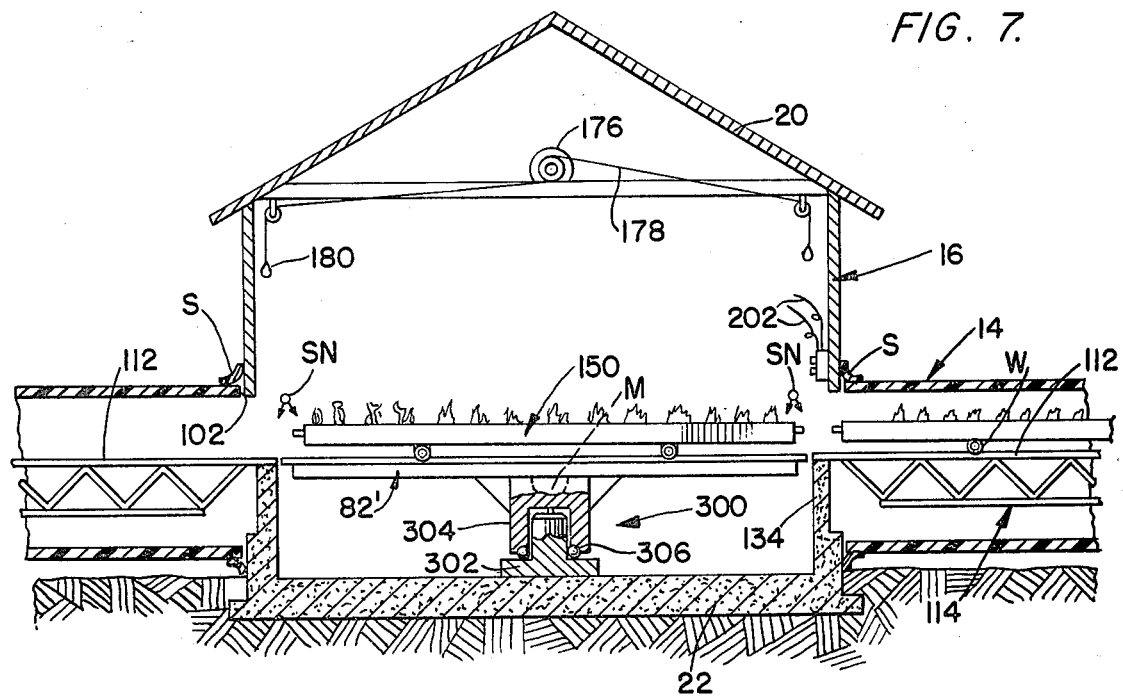
FIG. 7 is an elevation view of an alternative embodiment of the structure embodying the teachings of the present invention.
Figure 8:
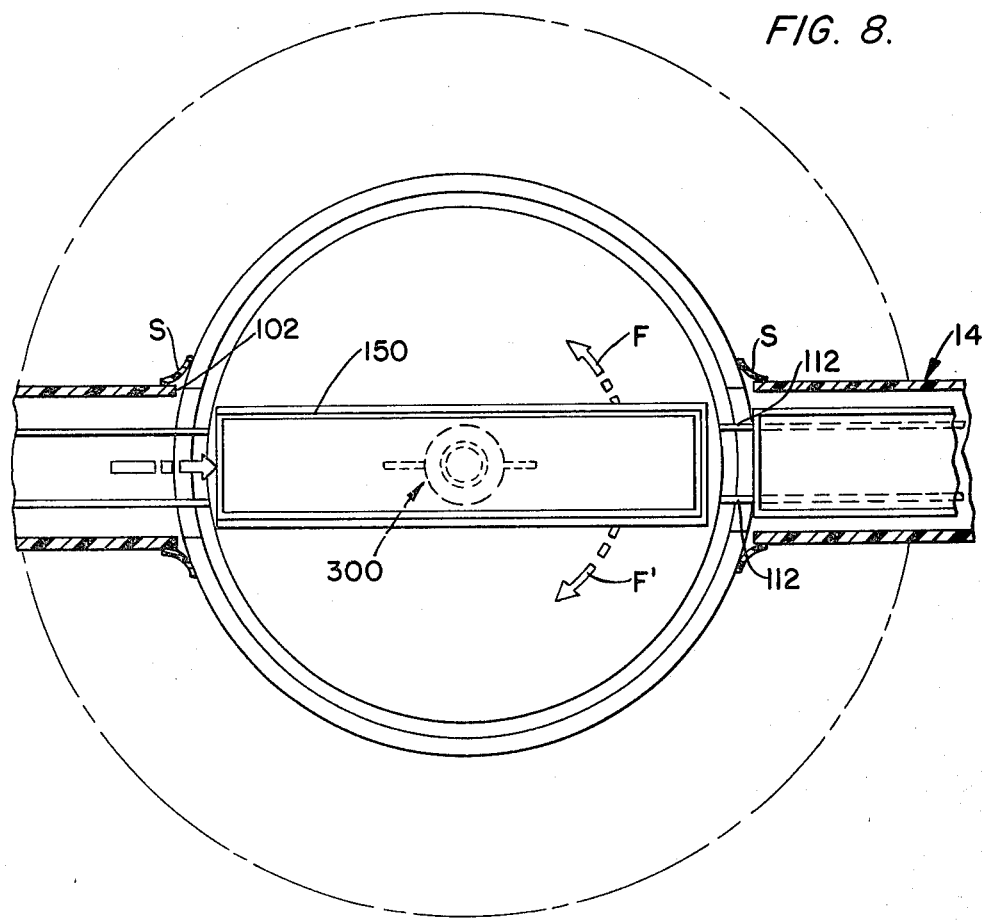
FIG. 8 is a top plan view of the FIG. 7 structure.

An alternative embodiment of the greenhouse is shown in FIGS. 7 and 8 and indicated by the reference indicator 10'. The greenhouse 10' includes a stationary floor 22 and movable rails 82'. The rails 82' include an upper surface and a mounting post 300. The post 300 includes a step bearing 302 and a sleeve 304 mounted thereon by movable means, such as ball bearings 306. The ball bearings are preferably nylon or the like so the humidity in the greenhouse will not affect the operation thereof.

The rails 82' rotate in either the clockwise or the counterclockwise direction as indicated by arrows F and F' in FIG. 8. A motor M is located within sleeve 304 and is mounted on the rails 82' and connected to the bearing 302 by a shaft 310. Operation of the motor rotates the rails relative to the bearing which is fixed on the stationary floor to rotate the rails relative to the floor. The motor can be controlled by control means 200. Alternatively, the rails can be moved by hand.

The operation of the greenhouse 10' is similar to that of the greenhouse 10 except that rails 82' rotate instead of the floor on which they are supported as is done in the greenhouse 10.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A greenhouse structure comprising:
   a central hub;
   a stationary foundation located within said hub;
   an upstanding stanchion mounted on said foundation;
   a planar floor rotatably mounted on said stanchion;
   a workbench mounted on said floor;
   a plurality of stationary elongate greenhouse growth chambers connected to said hub, said growth chambers radiating outwardly from said central hub and being adapted for plant care and storage;
   a plurality of rails in each growth chamber;
   a plurality of trays supportable on said rails, each of said trays having coupling means thereon for releasably coupling said each tray to an adjacent tray;
   means for rotating said floor with respect to said foundation so that said workbench can be aligned with rails in each growth chamber;
   means for moving a tray to and from said workbench; and
   overhead hoist means for lifting trays from said workbench.

2. The greenhouse defined in claim 1 wherein said hub and said floor are circular.

3. The greenhouse defined in claim 2 wherein said growth chambers are tubular.

4. The greenhouse defined in claim 1 wherein each tray is rectangular and has a length less than the diameter of said floor.

5. The greenhouse defined in claim 4 wherein said floor has a diameter slightly less than the diameter of said stationary foundation.

6. The greenhouse defined in claim 1 further including a plurality of wheels movably mounting said floor on said foundation.

7. A method of caring for plants which includes steps of:
   defining a central workroom;
   locating a plurality of elongate growth chambers around the circumference of the central workroom so the growth chambers radiate outwardly from such workroom;
   connecting all of the growth chambers to the workroom;
   locating an elongate workbench in the workroom;
   storing the plants in trays in a plurality of growth chambers with the growth chambers being exposed to sunlight;
   moving some of the plants from that particular growth chamber onto the workbench in the workroom, said moving step including placing the plants in a tray and placing said tray on rails; and
   periodically reversing plants 180° for allowing sunlight to reach each side of such plants.

8. The method defined in claim 7 wherein said moving step further includes hoisting the plants from the rail into an overhead position.

9. The method defined in claim 8 further including a step of maintaining the hoisted plants overhead while further plants are conveyed to the workroom.

10. A method of caring for plants which includes steps of:
    defining a central workroom;
    locating a plurality of elongate growth chambers around the circumference of the central workroom so the growth chambers radiate outwardly from such workroom;
    connecting all of the growth chambers to the workroom;
    locating an elongate workbench in the workroom;
    storing plants in trays in each growth chamber;
    rotating the workbench to be axially aligned with a particular growth chamber;
    moving selected plants from that particular growth chamber onto the workbench;
    working on the selected plants located on the workbench;
    after performing the work on the plants, moving plants from the workbench back into the particular growth chamber while spraying those worked on selected plants as they re-enter the growth chamber using nozzles located directly above and below the trays; and
    rotating the workbench to a next growth chamber.

* * * * *